United States Patent
Monroy-Hernández et al.

(10) Patent No.: US 11,349,797 B2
(45) Date of Patent: *May 31, 2022

(54) CO-LOCATION CONNECTION SERVICE

(71) Applicant: Snap Inc., Santa Monica, CA (US)

(72) Inventors: Andrés Monroy-Hernández, Seattle, WA (US); Yu Jiang Tham, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,053

(22) Filed: Nov. 25, 2020

(65) Prior Publication Data

US 2022/0070126 A1    Mar. 3, 2022

Related U.S. Application Data

(63) Continuation-in-part of application No. 17/007,961, filed on Aug. 31, 2020.

(51) Int. Cl.
| | |
|---|---|
| *G06F 15/16* | (2006.01) |
| *H04L 51/222* | (2022.01) |
| *H04L 67/306* | (2022.01) |
| *H04W 4/80* | (2018.01) |
| *H04W 76/14* | (2018.01) |
| *H04L 51/52* | (2022.01) |

(Continued)

(52) U.S. Cl.
CPC ............. *H04L 51/20* (2013.01); *H04L 51/04* (2013.01); *H04L 51/046* (2013.01); *H04L 51/32* (2013.01); *H04L 67/306* (2013.01); *H04W 4/80* (2018.02); *H04W 76/14* (2018.02)

(58) Field of Classification Search
CPC ....... H04L 51/32; H04L 51/20; H04L 51/046; H04L 51/04
USPC .......................................... 709/227; 455/41.2
See application file for complete search history.

(56) References Cited

U.S. PATENT DOCUMENTS

| | | |
|---|---|---|
| 2012/0046862 A1 | 2/2012 | Griffin et al. |
| 2016/0342774 A1 | 11/2016 | Henkel-Wallace et al. |
| 2017/0019855 A1 | 1/2017 | Gu |

(Continued)

OTHER PUBLICATIONS

"International Application Serial No. PCT/US2021/059895, International Search Report dated Mar. 14, 2022", 4 pgs.

(Continued)

*Primary Examiner* — Wing F Chan
*Assistant Examiner* — Andrew Woo
(74) *Attorney, Agent, or Firm* — Schwegman Lundberg & Woessner, P.A.

(57) ABSTRACT

An example co-location connection service is described. The online co-location connection service is provided by a messaging system configured to selectively pair user profiles associated with respective client devices equipped with sensors that communicate with each other within the predetermined physical range. The messaging system monitors physical proximity of the client devices based on the sensor data obtained by the co-location connection service from the respective messaging clients executing at the respective client devices. In response to detecting that the client devices are within a predetermined physical proximity range the messaging system generates co-location experience by modifying the user interface in the respective messaging clients.

20 Claims, 7 Drawing Sheets

(51) Int. Cl.
 H04L 51/046 (2022.01)
 H04L 51/04 (2022.01)

(56) References Cited

U.S. PATENT DOCUMENTS

2017/0124296 A1* 5/2017 Baldwin .............. G06Q 50/184
2020/0213298 A1* 7/2020 Ericson ................ H04W 12/63

OTHER PUBLICATIONS

"International Application Serial No. PCT/US2021/059895, Written Opinion dated Mar. 14, 2022", 6 pgs.

* cited by examiner

CO-LOCATION CONNECTION SERVICE

CLAIM OF PRIORITY

This application is a continuation-in-part of U.S. patent application Ser. No. 17/007,961, filed on Aug. 31, 2020, which is incorporated herein by reference in its entirety.

TECHNICAL FIELD

The present disclosure relates generally to facilitating interactions between devices hosting a messaging application.

BACKGROUND

The popularity of computer-implemented tools that permit users to access and interact with content and other users online continues to grow. For example, various computer-implemented tools exist that permit users to share content with other users through messaging applications or to play with other users online in multiplayer video games. Some of such computer-implemented tools, termed applications or apps, can be designed to run on a mobile device such as a phone, a tablet, or a watch.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

A messaging server system, which hosts backend service for an associated messaging client, is configured to detect a co-location event indicating that two devices executing respective messaging clients are located within a certain physical proximity and respond to the co-location event by unlocking one or more user experiences previously designated as co-location experiences.

The technical problem of providing an online experience to a pair of users represented by respective user profiles in the messaging server system, in a way that the experience served to the respective associated messaging clients changes based on the users' physical proximity to each other, is addressed by an online co-location connection service configured to selectively pair user profiles associated with respective client devices equipped with sensors that communicate with each other within the predetermined physical proximity range, monitor physical proximity of the client devices based on the sensor data obtained by the co-location connection service from the respective messaging clients executing at the respective client devices and, in response to detecting that the client devices are within a predetermined physical proximity range, modifying the user interface in the respective messaging clients. A predetermined physical proximity range may be referred to as the co-location range. A user interface modified in response to detecting that the client devices are within a predetermined physical proximity range is an example of a co-location experience.

The operation of pairing two user profiles associated with respective client devices comprises designating these two user profiles, in a database that stores profiles representing users in the messaging server system, as co-location buddies. For example, each of the paired profiles may include an identification of the other profile and a flag indicating that the other profile is its co-location buddy. In some embodiments, the process of pairing includes receiving, from a user, a request to be paired with another user, obtaining a consent to be paired from the other user, and determining that the respective client devices of the two users are configured to communicate with each other directly over a near field communication technology, such as, e.g., a wireless personal area network technology, radio-frequency identification (RFID), etc.

The profiles representing the two users are then designated as co-location buddies in the database. Obtaining the consent to be paired from a user may entail communicating, from the messaging server system to the associated client device, a message or a user interface including a selectable option to grant or to deny consent to be paired. The messaging server system effectuates the pairing if the option to grant consent was selected and does not effectuate the pairing if the option to deny consent was selected of if not response was received. For the purposes of this description, the messaging clients associated with the paired user profiles are referred to as paired messaging clients, and the associated client devices are referred to as paired client devices. When the paired client devices come into the co-location range within each other, a co-location event is sent from one client device to the other, and, also, the co-location event is sent to the messaging server system.

As mentioned above, an example of a co-location experience is a user interface modified in response to detecting that the client devices are within a predetermined physical proximity range, also referred to as a co-location user interface (UI). The co-location UI may include an indication of co-location of the devices, as well as a visual control actionable to activate a feature that is not otherwise made available to the users, such as, e.g., an HTML5-based app or a game. The co-location UI may, in some embodiments, include animation configured to playback overlaid over a screen of the messaging client. Such animation may be an animated image with a transparent background, e.g., of a couple engaged in an activity that in non-virtual realm is only possible when two people are in close proximity, such as hugging or dancing. Another example of such animation is a depiction of hearts or balloons floating through the screen of the messaging client. The co-location UI may show respective custom avatars representing the paired user profiles, where the avatars are modified in a manner indicating that the other person is nearby. When the messaging server system detects that paired devices are no longer within a predetermined physical proximity range, the co-location experience is made unavailable to the users of the paired messaging clients.

While some less resource-intensive co-location experiences (sharing a simple animation) may be provided by the paired messaging clients to their users directly, without a roundtrip to the messaging server system, other co-location experiences (a more complex animation or a two player game) may include interaction with the messaging server system. Furthermore, while a co-location connection service is described in the context of a messaging system, the co-location methodology described herein may be utilized beneficially in any scenario where users interact via their client devices. For example, when users are engaged in an interactive game via their client devices, co-location methodology may be used to unlock additional power-ups in response to detecting co-location of the client devices. An online co-location connection service may be provided in an online messaging system comprising a messaging client and an associated backend service, which is described with reference to FIG. 1 below.

Networked Computing Environment

Figure 1:
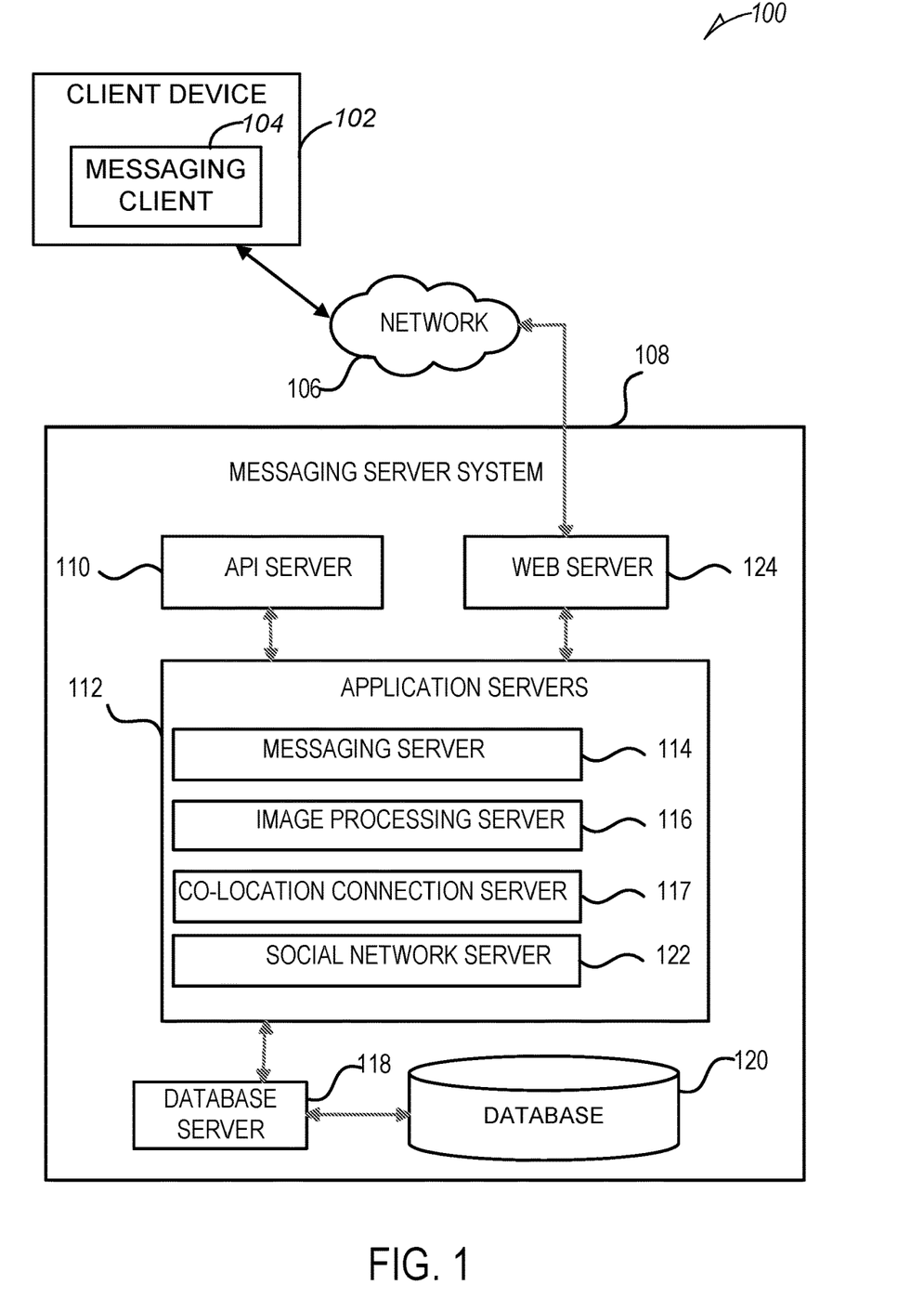
FIG. 1 is a diagrammatic representation of a networked environment in which a co-location connection service may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). A client device hosting a messaging client 104 may be equipped with sensors permitting the messaging client 104 to communicate and exchange data (e.g., a Bluetooth UUID) with another messaging client 104 over a near field communication technology, such as, e.g., Bluetooth Low Energy technology.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Figure 7:
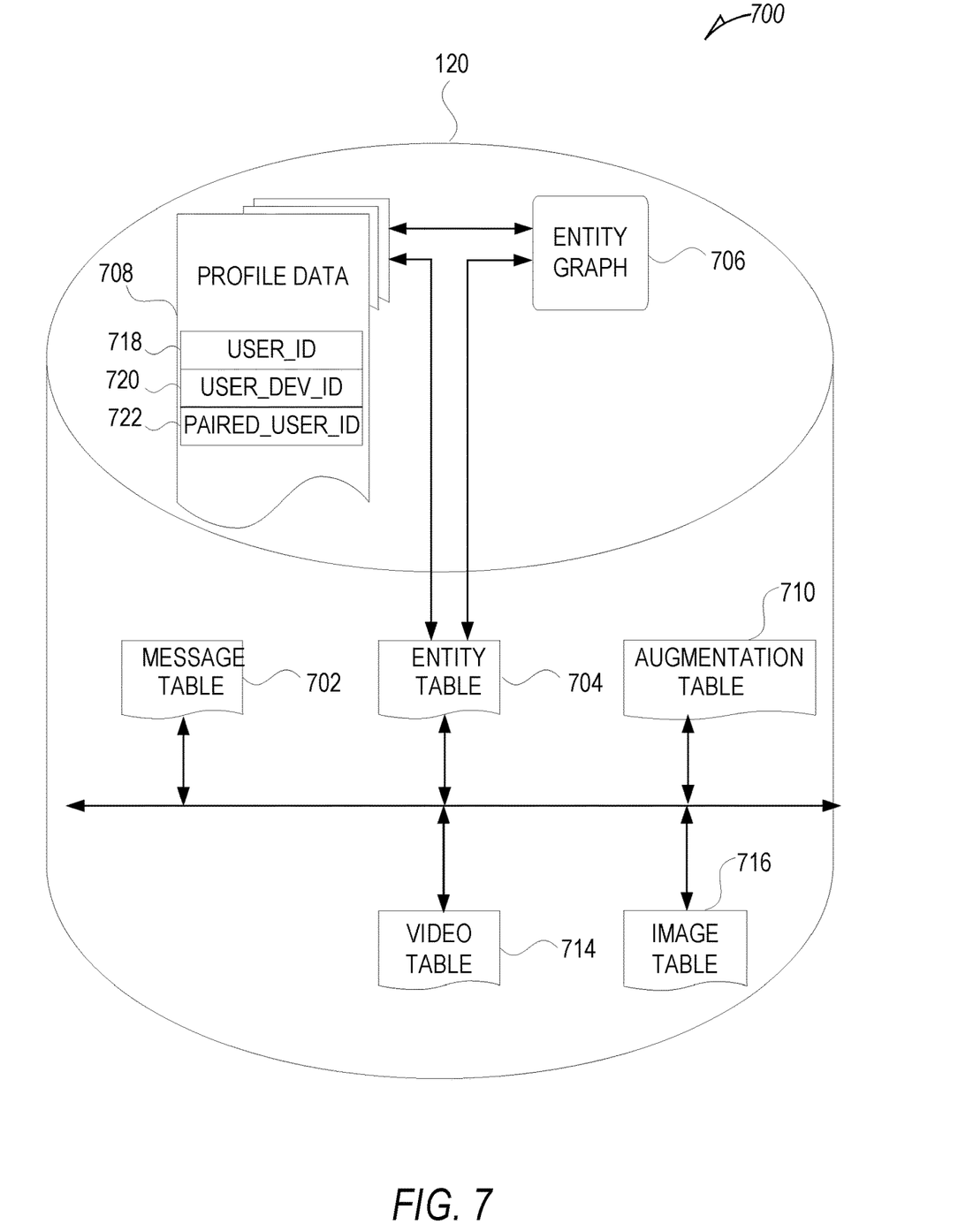
FIG. 7 is a diagrammatic representation of a data structure as maintained in a database, in accordance with some examples.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as records related to changes made by the user to their profile data. Where a first user profile and a second user profile have been designated as co-location buddies for the purpose of accessing the co-location connection service, the first user profile includes a unique identification of the user's client device and an identification of the second user profile. The second user profile, in turn, includes a unique identification of their client device and an identification of the first user profile. An example of profile data that represents a profile paired with another user profile in the messaging system, where the paired profiles represent users of the co-location connection service is shown in FIG. 7, which is described further below.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server 114. The social network server 122 supports various social networking functions and services and makes these functions and services available to the messaging server 114.

Also shown in FIG. 1 is a co-location server 117. The co-location server 117 provides an online co-location connection service configured to selectively pair user profiles associated with respective client devices equipped with sensors that communicate with each other within the predetermined physical range, monitor physical proximity of the client devices based on the sensor data obtained by the co-location connection service from the respective messaging clients executing at the respective client devices and, in response to detecting that the client devices are within a predetermined physical proximity range, generates co-location experience by modifying the user interface in the respective messaging clients. While, as shown in FIG. 1, an online co-location connection service is provided at the co-location server 117, in some examples, an online co-location connection service may be provided at a messaging server, e.g., by the messaging server 114.

The location of a co-location functionality may be either within the messaging client 104 or the messaging server system 108 or both. An example co-location system, which is supported on the client-side by the messaging client 104 and on the sever-side by the application servers 112, is discussed below with reference to FIG. 6.

System Architecture

Figure 6:
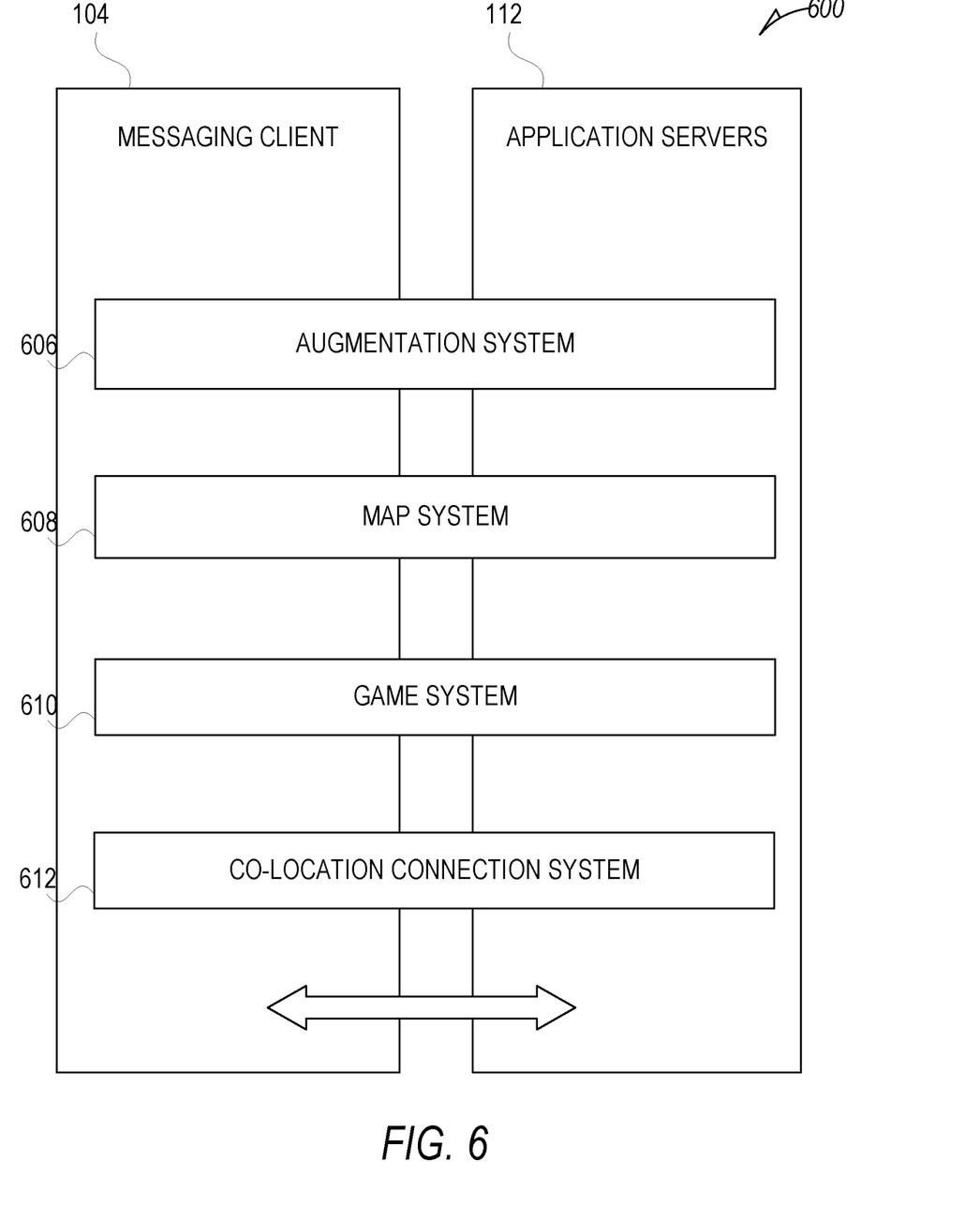
FIG. 6 is a diagrammatic representation of a messaging system, in accordance with some examples, that has both client-side and server-side functionality.

FIG. 6 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an augmentation system 606, a map system 608, a game system 610, as well as a co-location connection system 612.

The co-location connection system 612 is configured to selectively pair user profiles associated with respective client devices equipped with sensors that communicate with each other within the predetermined physical proximity range. The co-location connection system 612 monitors physical proximity of the client devices based on the sensor data obtained by the co-location connection service from the respective messaging clients executing at the respective client devices. In response to detecting that the client devices are within a predetermined co-location range, the co-location connection system 612 serves a co-location experience to the respective associated messaging clients executing at the respective client devices by modifying the user interface in the respective messaging clients. An example of a co-location experience is an augmented reality experience provided by the augmentation system 606.

The augmentation system 606 provides various functions that enable a user to augment (e.g., annotate or otherwise modify or edit) media content associated with a message. For example, the augmentation system 606 provides functions related to the generation and publishing of media overlays for messages processed by the messaging system 100. The augmentation system 606 operatively supplies a media overlay or augmentation (e.g., an image filter) to the messaging client 104 based on a geolocation of the client device 102. In another example, the augmentation system 606 operatively supplies a media overlay to the messaging client 104 based on other information, such as in response to the co-location connection system 612 detecting that the client devices are within a predetermined co-location range. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the co-location connection system 612 and/or the augmentation system 606 cooperate with the map system 608, provides various geographic location functions, and supports the presentation of map-based media content and messages by the messaging client 104.

Other examples of co-location experiences are experiences provided by the game system 610, where the co-location connection system 612 generates a co-location UI that includes a visual control actionable to activate a game. The game system 610 provides various gaming functions within the context of the messaging client 104. The messaging client 104 provides a game interface that includes a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and, also, supports the provision of in-game rewards (e.g., coins and items).

In some examples, a co-location experience provided by the co-location connection system 612 includes providing access to certain external resources, e.g., applications or applets that the respective messaging clients associated with the paired client devices may launch, e.g., by accessing an HTML5 file from a third-party servers. HTML5 is used as an example technology for programming games, but applications and resources programmed based on other technologies can also be used.

As mentioned above, where two user profiles have been paired for the purpose of accessing the co-location connection service, the database that stores profile data (e.g., database 120 of FIG. 1) reflects such pairing. Example data architecture is illustrated in FIG. 7, which is discussed below.

Data Architecture

FIG. 7 is a schematic diagram illustrating data structures 700, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 702. This message data includes, for any particular one message, at least message sender data, message recipient (or receiver) data, and a payload. Further details regarding information that may be included in a message, and included within the message data stored in the message table 702 is described below with reference to FIG. 4.

An entity table 704 stores entity data, and is linked (e.g., referentially) to an entity graph 706 and profile data 708. Entities for which records are maintained within the entity table 704 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 706 stores information regarding relationships and associations between entities. Such relationships may be social, professional (e.g., work at a common corporation or organization) interested-based or activity-based, merely for example. The entity graph 706 may also store information reflecting the pairing of user profiles representing users of the co-location connection system 612 of FIG. 6.

The profile data 708 stores multiple types of profile data about a particular entity. The profile data 708 may be selectively used and presented to other users of the messaging system 100, based on privacy settings specified by a particular entity. Where the entity is an individual, the profile data 708 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time. The profile data 708 that represents a profile paired with another user profile, where the paired profiles represent users of the co-location connection service 117, include, in addition to a user identification 718, a user device identification 720 and a paired user identification 722. In one example, given a user profile that includes a user identification, a user device identification and a paired user identification, the location data exchange component of the power optimization system 206 shown in FIG. 2 obtains location data of a user device (represented by the user device identification), determines the paired profile based on the paired user identification, and communicates the obtained location data of the user device to the paired device represented by a user device identification stored in the paired profile.

The database 120 also stores augmentation data, such as overlays or filters, in an augmentation table 710. The augmentation data is associated with and applied to videos (for which data is stored in a video table 714) and images (for which data is stored in an image table 716). As mentioned above, the video table 714 stores video data that, in one example, is associated with messages for which records are maintained within the message table 702. Similarly, the image table 716 stores image data associated with messages for which message data is stored in the entity table 704. The entity table 704 may associate various augmentations from the augmentation table 710 with various images and videos stored in the image table 716 and the video table 714.

Figure 2:
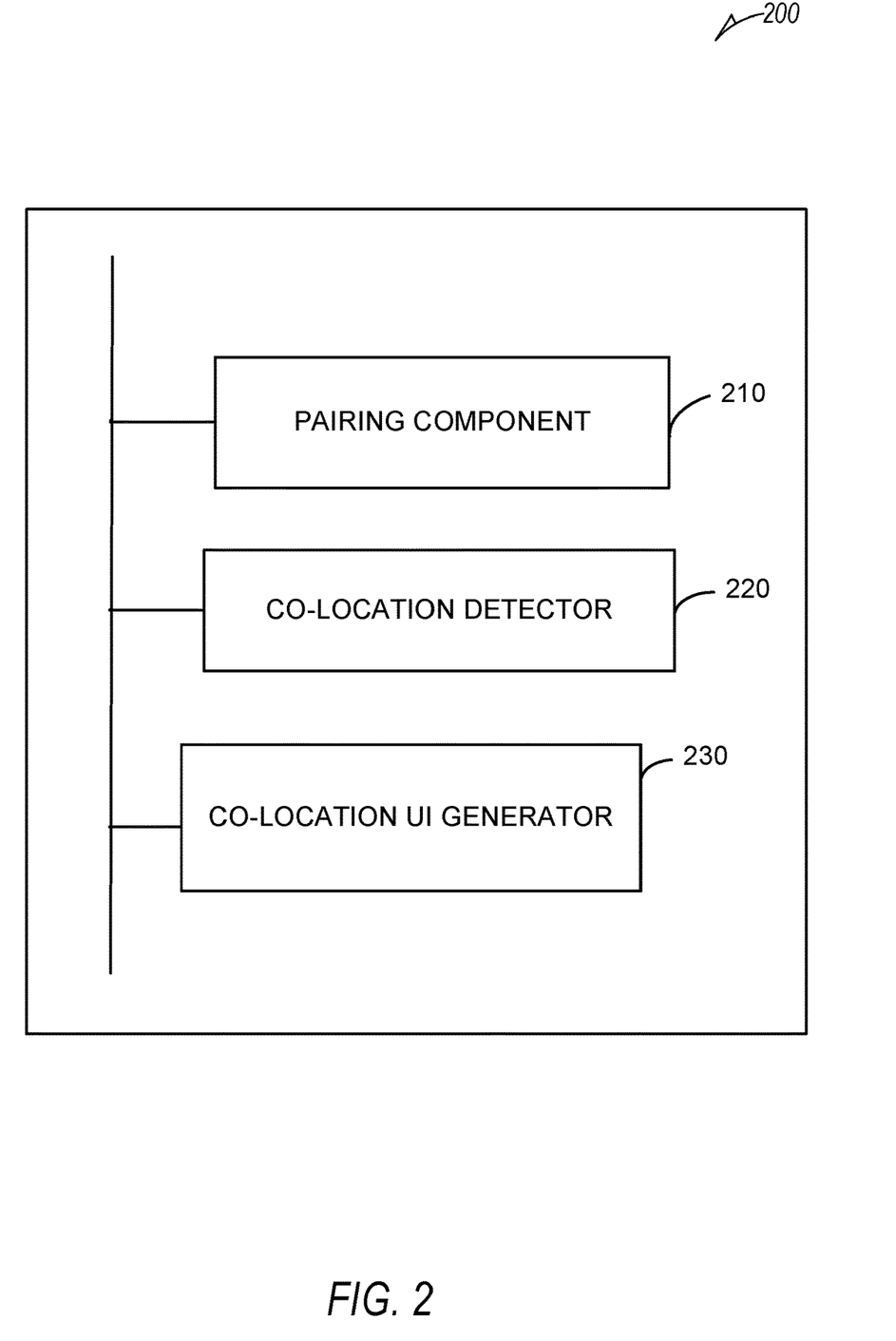
FIG. 2 is a block diagram of an architecture of a system for providing co-location experience, in accordance with some examples.

FIG. 2 is a block diagram illustrating an example system 200 for providing co-location experience to users of the of the co-location connection system 612 of FIG. 6. In some examples, the system 200 corresponds to the co-location connection system 612 shown in FIG. 6. The system 200 includes a pairing component 210, a co-location detector 220, and a co-location UI generator 230. The pairing component 210 is configured to pair two user profiles. In some embodiments, only paired user profiles can access the co-location service provided by the co-location connection system 612. The pairing of a first user profile associated with a first client device and a second user profile associated with a second client device is performed online. The pairing comprises determining that the first client device and the second client device include respective short range communication sensors configured to communicate with each other within the predetermined physical range. The pairing operation may be performed without requiring that the two client devices are, at the time of pairing, are within a communication range permitted by their respective short range communication sensors and without requiring a communication between the first client device and the second client device via a short-range wireless communication technology. The pairing comprises receiving, from the first client device, a pairing request to pair the first user profile with the second user profile; in response to the pairing request, obtaining a consent response from the second device, the consent associated with the second user profile; and subsequent to the obtaining of the consent response, pairing the first user profile and the second user profile.

The co-location detector 220 is configured to detect a co-location event indicating that a first client device executing a messaging client and a second client device executing the messaging client are located within a predetermined physical range. The detecting of the co-location event comprises receiving, from the first client device an indication of a connection established between the first client device and the second client device via a short-range wireless communication technology. The co-location detector 220 is further configured to detect a distancing event with respect to two client devices and, in response to the detecting of the distancing event, communicate, to the client devices, a visual indication of the distancing event. A distancing event indicates that the first client device and the second client device are located outside of the predetermined physical range. The distancing event comprises receiving, from the first client device, an indication that a previously established connection between the first client device and the second client device via a short-range wireless communication technology has been terminated.

The co-location UI generator 230 is configured to generate, in response to the co-location detector 220 detecting of the co-location event, a co-location user interface. The co-location user interface may include, e.g., an indication of co-location of the first client device and the second client device, a visual control actionable to activate an HTML5-based application, and/or animation configured to playback overlaid over a screen of the messaging client executing at the first client device.

Each of the various components of the system 200 may be provided at the client device 102 and/or at the messaging server system 108 of FIG. 1. Further details regarding the operation of the system 200 are described below.

Figure 3:
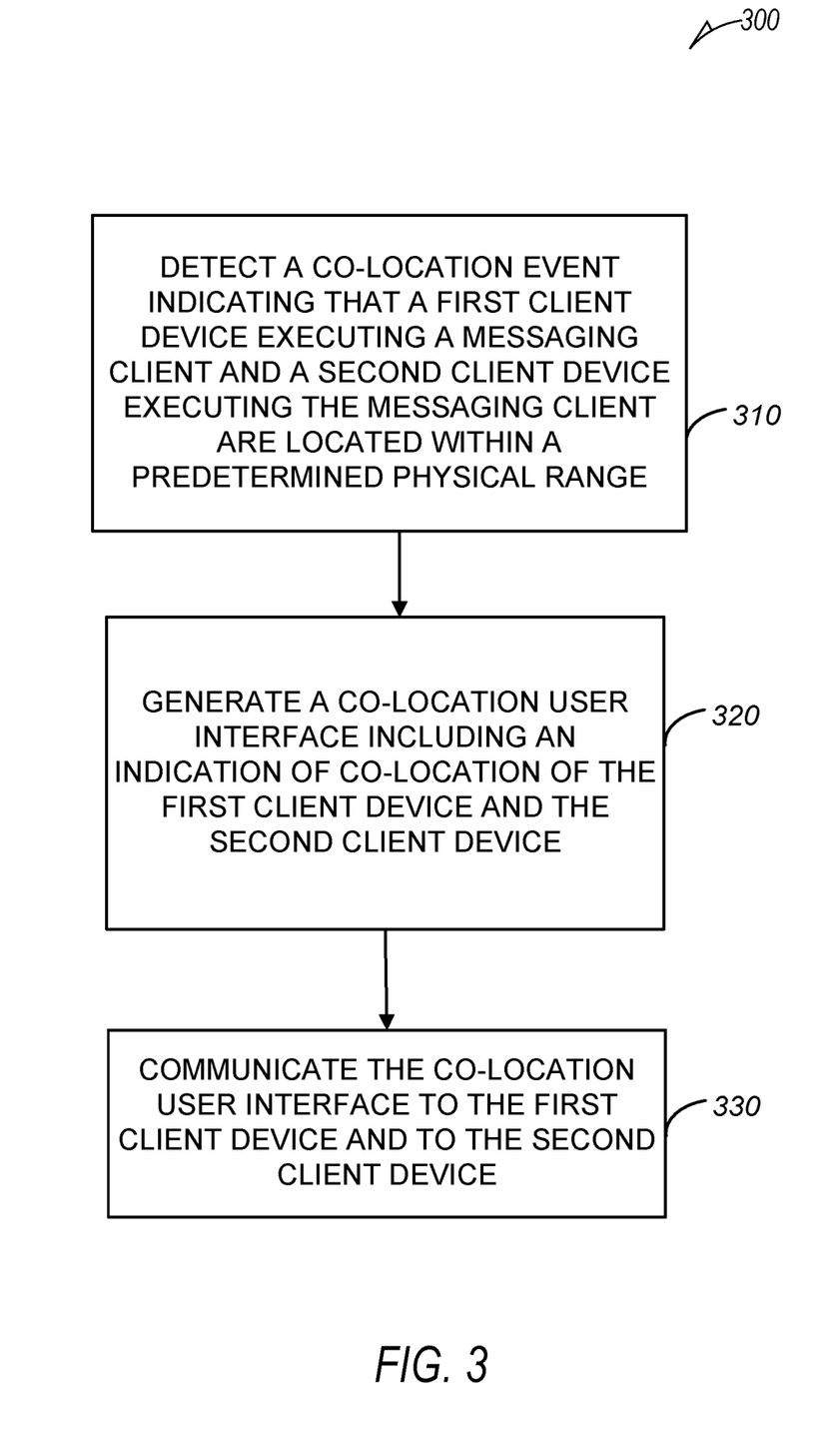
FIG. 3 is a flowchart of a method for providing co-location experience, in accordance with some examples.

FIG. 3 is a flowchart of a method 300 for providing co-location experience. The method 300 may be performed by processing logic that may comprise hardware (e.g., dedicated logic, programmable logic, microcode, etc.), software, or a combination of both. In one example embodiment, some or all processing logic resides at the client device 102 of FIG. 1 and/or at the messaging server system 108 of FIG. 1. Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

At operation 310, the co-location detector 220 of the co-location connection system 612 detects a co-location event indicating that a first client device executing a messaging client and a second client device executing the messaging client are located within a predetermined physical range. At operation 320, the co-location UI generator 230, in response to the detecting of the co-location event, generates a co-location user interface including an indication of co-location of the first client device and the second client device. The co-location user interface is communicated to the first client device and to the second client device at operation 330.

Figure 4:
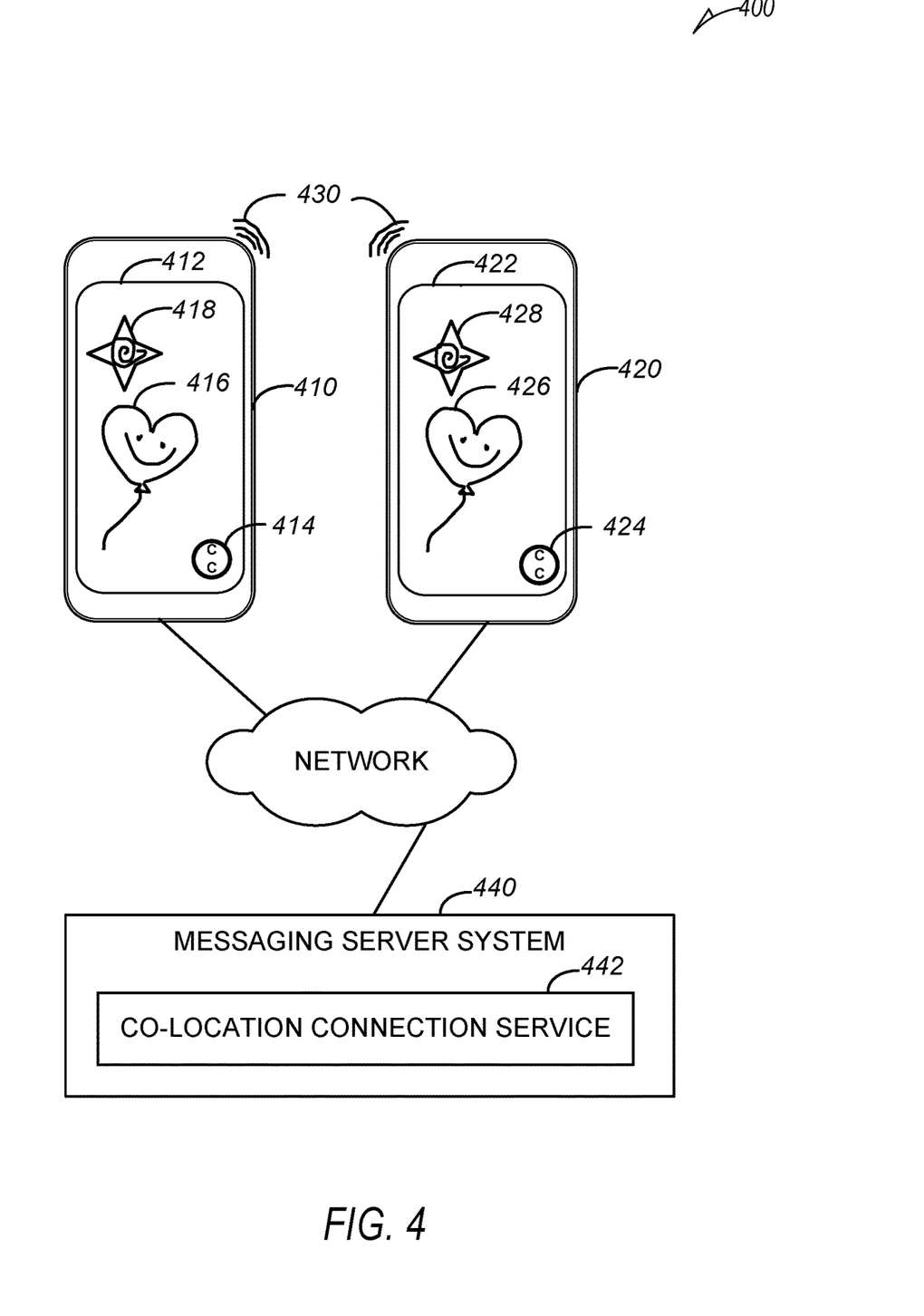
FIG. 4 is a diagrammatic representation of an example co-location experience manifested on respective display devices of co-location buddies.

FIG. 4 is a diagrammatic representation 400 of an example co-location experience manifested on respective display devices of co-location buddies. As shown in FIG. 4, paired client devices 410 and 420 host respective messaging clients. Respective screens 412 and 422 of the messaging clients display respective indications 414 and 424 of the client devices 410 and 420 being located within the communication range of a signal 430 and thus identified by a co-location connection service 442 hosted at a messaging server 440 as co-located. The paired client devices 410 and 420 communicate with the messaging server 440 via a network, such as, e.g., the Internet. Respective screens 412 and 422 of the messaging clients also display respective animations 416 and 426 configured to playback (e.g., float upwards) overlaid over the respective screens 412 and 422 and respective visual controls 418 and 428 actionable to activate a further application, e.g., an HTML5-based app.

Machine Architecture

Figure 5:
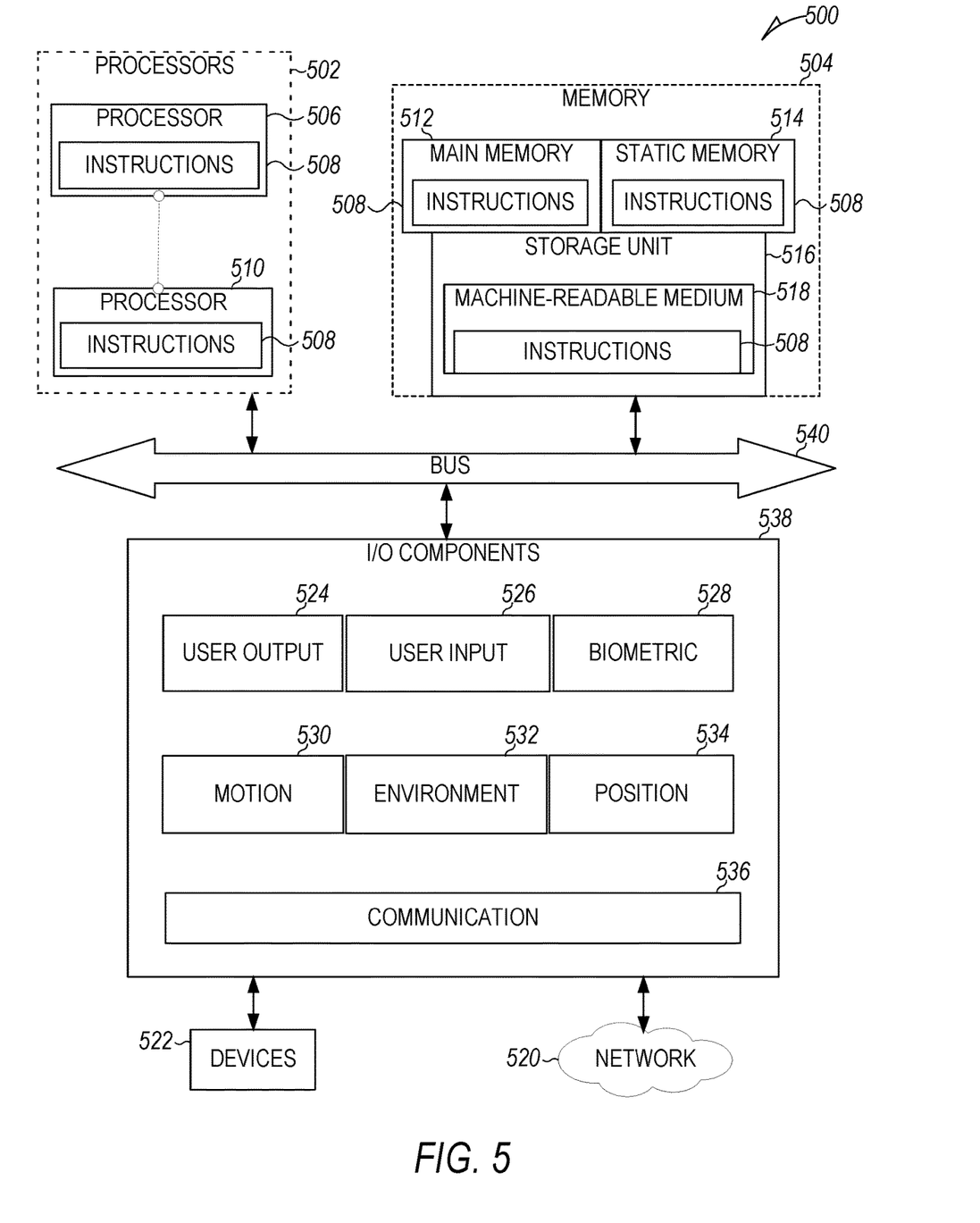
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 600 within which instructions 608 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein. The machine 500, for example, may comprise the client device 102 or any one of a number of server devices forming part of the messaging server system 108. In some examples, the machine 500 may also comprise both client and server systems, with certain operations of a particular method or algorithm being performed on the server-side and with certain operations of the particular method or algorithm being performed on the client-side.

The machine 500 may include processors 502, memory 504, and input/output I/O components 538, which may be configured to communicate with each other via a bus 540. In an example, the processors 502 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single-core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 540. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 within the storage unit 515, within at least one of the processors 502 (e.g., within the Processor's cache memory), or any suitable combination thereof, during execution thereof by the machine 500.

The I/O components 538 may include a wide variety of components to receive input, provide output, produce output, transmit information, exchange information, capture measurements, and so on. The specific I/O components 538 that are included in a particular machine will depend on the type of machine. For example, portable machines such as mobile phones may include a touch input device or other such input mechanisms, while a headless server machine will likely not include such a touch input device. It will be appreciated that the I/O components 538 may include many other components that are not shown in FIG. 5. In various examples, the I/O components 538 may include user output components 524 and user input components 526. The user output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 538 may include biometric components 528, motion components 530, environmental components 532, or position components 534, among a wide array of other components. For example, the biometric components 528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 530 include acceleration sensor components (e.g., accelerometer), gravitation sensor components, rotation sensor components (e.g., gyroscope).

The environmental components 532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 538 further include communication components 536 operable to couple the machine 500 to a network 520 or devices 522 via respective coupling or connections. For example, the communication components 536 may include a network interface Component or another suitable device to interface with the network 520. In further examples, the communication components 536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 536, such as location via Internet Protocol (IP) geolocation, location via Wi-Fi® signal triangulation, location via detecting an NFC beacon signal that may indicate a particular location, and so forth.

The various memories (e.g., main memory 512, static memory 514, and memory of the processors 502) and storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed examples.

The instructions 508 may be transmitted or received over the network 520, using a transmission medium, via a network interface device (e.g., a network interface component included in the communication components 536) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 522.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   in an online messaging system comprising a messaging client and an associated backend service, the online messaging system providing a co-location connection service accessible from a client device via the messaging client;
   detecting a co-location event indicating that a first client device executing the messaging client and a second client device executing the messaging client are located within a predetermined physical range;
   in response to the detecting of the co-location event, generating a co-location user interface, the co-location user interface including an indication of co-location of the first client device and the second client device; and
   causing presentation of the co-location user interface to the first client device and to the second client device.

2. The method of claim 1, wherein the detecting of the co-location event, comprises receiving, from the first client device an indication of a connection established between the first client device and the second client device via a short-range wireless communication technology.

3. The method of claim 1, wherein the generating of the co-location user interface comprises including, in the co-location user interface, a visual control actionable to activate a further application.

4. The method of claim 1, wherein the generating of the co-location user interface comprises including, in the co-location user interface, animation configured to playback overlaid over a screen of the messaging client executing at the first client device.

5. The method of claim 1, wherein the messaging maintains profiles representing respective users of the co-location connection service, the first client device is associated with a first user profile from the profiles, the second client device is associated with a second user profile from the profiles.

6. The method of claim 5, further comprising, pairing the first user profile and the second user profile online, the pairing comprising:
   receiving, from the first client device, a pairing request to pair the first user profile with the second user profile;
   in response to the pairing request, obtaining a consent response from the second device, the consent associated with the second user profile; and
   subsequent to the obtaining of the consent response, pairing the first user profile and the second user profile.

7. The method of claim 6, wherein the pairing comprises determining that the first client device and the second client device include respective sensors configured to communicate with each other within the predetermined physical range.

8. The method of claim 7, wherein the pairing is effectuated without a communication between the first client device and the second client device via a short-range wireless communication technology.

9. The method of claim 1, further comprising:
   detecting a distancing event indicating that the first client device and the second client device are located outside of the predetermined physical range; and
   in response to the detecting of the distancing event, communicating, to the first client device and to the second client device, a visual indication of the distancing event.

10. The method of claim 9, wherein the detecting of the distancing event comprises receiving, from the first client device, an indication that a previously established connection between the first client device and the second client device via a short-range wireless communication technology has been terminated.

11. A system comprising:
one or more processors; and
a non-transitory computer readable storage medium comprising instructions that when executed by the one or processors cause the one or more processors to perform operations comprising:
in an online messaging system comprising a messaging client and an associated backend service, the online messaging system providing a co-location connection service accessible from a client device via the messaging client;
detecting a co-location event indicating that a first client device executing the messaging client and a second client device executing the messaging client are located within a predetermined physical range;
in response to the detecting of the co-location event, generating a co-location user interface, the co-location user interface including an indication of co-location of the first client device and the second client device; and
causing presentation of the co-location user interface to the first client device and to the second client device.

12. The system of claim 11, wherein the detecting of the co-location event, comprises receiving, from the first client device an indication of a connection established between the first client device and the second client device via a short-range wireless communication technology.

13. The system of claim 11, wherein the generating of the co-location user interface comprises including, in the co-location user interface, a visual control actionable to activate a further application.

14. The system of claim 11, wherein the generating of the co-location user interface comprises including, in the co-location user interface, animation configured to playback overlaid over a screen of the messaging client executing at the first client device.

15. The system of claim 11, wherein the messaging maintains profiles representing respective users of the co-location connection service, the first client device is associated with a first user profile from the profiles, the second client device is associated with a second user profile from the profiles.

16. The system of claim 15, wherein the operations caused by instructions executed by the one or processors include:

pairing the first user profile and the second user profile online, the pairing comprising:
receiving, from the first client device, a pairing request to pair the first user profile with the second user profile;
in response to the pairing request, obtaining a consent response from the second device, the consent associated with the second user profile; and
subsequent to the obtaining of the consent response, pairing the first user profile and the second user profile.

17. The system of claim 16, wherein the pairing comprises determining that the first client device and the second client device include respective sensors configured to communicate with each other within the predetermined physical range.

18. The system of claim 17, wherein the pairing is effectuated without a communication between the first client device and the second client device via a short-range wireless communication technology.

19. The system of claim 11, wherein the operations caused by instructions executed by the one or processors include:
detecting a distancing event indicating that the first client device and the second client device are located outside of the predetermined physical range; and
in response to the detecting of the distancing event, communicating, to the first client device and to the second client device, a visual indication of the distancing event.

20. A machine-readable non-transitory storage medium having instruction data executable by a machine to cause the machine to perform operations comprising:
in an online messaging system comprising a messaging client and an associated backend service, the online messaging system providing a co-location connection service accessible from a client device via the messaging client;
detecting a co-location event indicating that a first client device executing the messaging client and a second client device executing the messaging client are located within a predetermined physical range;
in response to the detecting of the co-location event, generating a co-location user interface, the co-location user interface including an indication of co-location of the first client device and the second client device; and
causing presentation of the co-location user interface to the first client device and to the second client device.

* * * * *

UNITED STATES PATENT AND TRADEMARK OFFICE
CERTIFICATE OF CORRECTION

PATENT NO. : 11,349,797 B2
APPLICATION NO. : 17/247053
DATED : May 31, 2022
INVENTOR(S) : Monroy-Hernàndez et al.

It is certified that error appears in the above-identified patent and that said Letters Patent is hereby corrected as shown below:

In the Claims

In Column 16, Line 7, in Claim 1, delete "client;" and insert --client:-- therefor In Column 17, Line 14, in Claim 11, delete "client;" and insert --client:-- therefor In Column 18, Line 35, in Claim 20, delete "client;" and insert --client:-- therefor Signed and Sealed this
Twenty-fourth Day of January, 2023

Katherine Kelly Vidal
*Director of the United States Patent and Trademark Office*